US011312416B2

(12) United States Patent
Prabhakar

(10) Patent No.: US 11,312,416 B2
(45) Date of Patent: Apr. 26, 2022

(54) THREE-DIMENSIONAL VEHICLE PATH GUIDELINES

(71) Applicant: Toyota Motor Engineering & Manufacturing North America, Inc., Plano, TX (US)

(72) Inventor: Varun Prabhakar, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 205 days.

(21) Appl. No.: 16/262,084

(22) Filed: Jan. 30, 2019

(65) Prior Publication Data

US 2020/0239075 A1 Jul. 30, 2020

(51) Int. Cl.
*B62D 15/02* (2006.01)
*B60R 1/00* (2006.01)
*G06F 3/0484* (2013.01)
*G06F 3/0481* (2013.01)
(Continued)

(52) U.S. Cl.
CPC ............ *B62D 15/0295* (2013.01); *B60R 1/00* (2013.01); *B60R 2300/304* (2013.01); *B60R 2300/8086* (2013.01); *G06F 3/04815* (2013.01); *G06F 3/04845* (2013.01)

(58) Field of Classification Search
CPC . B62D 15/0295; B60R 1/00; B60R 2300/304; B60R 2300/8086; G06F 3/04815; G06F 3/04845
See application file for complete search history.

(56) References Cited

U.S. PATENT DOCUMENTS

| 6,411,867 B1 * | 6/2002 | Sakiyama | B60Q 9/005 340/901 |
| 7,204,504 B2 | 4/2007 | Gehring et al. | |
| 8,976,246 B1 | 3/2015 | Rappuhn | |

(Continued)

FOREIGN PATENT DOCUMENTS

JP 2006160060 A * 6/2006
JP 2008049889 A * 3/2008

OTHER PUBLICATIONS

Kato, Koji; English translation of Parking Assisting Device (JP2008049889A); 2008 (Year: 2008).*

(Continued)

*Primary Examiner* — Fadey S. Jabr
*Assistant Examiner* — Naeem Taslim Alam
(74) *Attorney, Agent, or Firm* — Christopher G. Darrow; Darrow Mustafa PC

(57) ABSTRACT

System, methods, and other embodiments described herein relate to aiding a user navigating a vehicle by displaying on a display device, a view of a front or rear of the vehicle with three-dimensional guideline walls overlaying the view. In one embodiment, a method includes, acquiring data that specifies a steering angle for the vehicle. The method includes determining, based on the steering angle data, a left three-dimensional guideline wall and a right three-dimensional guideline wall that together identify a potential path of travel for the vehicle. Each three-dimensional guideline wall has a height based at least on a height of a portion of the vehicle, and wherein the left and right three-dimensional guideline walls have a distance therebetween based at least on a width of the vehicle.

19 Claims, 7 Drawing Sheets

(51) Int. Cl.
   *G06F 3/04845* (2022.01)
   *G06F 3/04815* (2022.01)

(56) References Cited

U.S. PATENT DOCUMENTS

| | | | |
|---|---|---|---|
| 9,275,287 B2* | 3/2016 | Watanabe | G06K 9/00798 |
| 9,428,111 B2 | 8/2016 | Mokashi et al. | |
| 9,731,568 B2 | 8/2017 | Wuergler et al. | |
| 2002/0145662 A1 | 10/2002 | Mizusawa et al. | |
| 2010/0062817 A1* | 3/2010 | Seydoux | A63F 13/216 |
| | | | 463/6 |
| 2010/0265048 A1* | 10/2010 | Lu | G06T 11/00 |
| | | | 340/435 |
| 2012/0229639 A1 | 9/2012 | Singleton | |
| 2013/0076007 A1 | 3/2013 | Goode et al. | |
| 2013/0321634 A1* | 12/2013 | Okano | G06T 11/00 |
| | | | 348/148 |
| 2014/0139677 A1* | 5/2014 | Lambert | H04N 7/183 |
| | | | 348/148 |
| 2014/0151979 A1 | 6/2014 | Puckett et al. | |
| 2016/0052548 A1 | 2/2016 | Singh et al. | |
| 2016/0082886 A1* | 3/2016 | Jeong | B60R 1/00 |
| | | | 348/118 |
| 2016/0121888 A1* | 5/2016 | Choi | G01S 13/862 |
| | | | 701/1 |
| 2017/0039438 A1* | 2/2017 | Homma | B60R 1/00 |
| 2017/0313262 A1* | 11/2017 | Wisnia | H04L 65/602 |
| 2017/0336222 A1* | 11/2017 | Yamaguchi | G01C 21/365 |
| 2018/0056874 A1* | 3/2018 | Lu | B60C 9/005 |
| 2019/0084419 A1* | 3/2019 | Suzuki | G09G 3/03 |
| 2019/0222820 A1* | 7/2019 | Lee | H04N 13/31 |
| 2019/0276078 A1* | 9/2019 | Pourrezaei Khaligh | |
| | | | B62D 13/005 |
| 2019/0308482 A1* | 10/2019 | Yamamoto | B60G 17/018 |
| 2020/0302657 A1* | 9/2020 | Shimazu | H04N 7/18 |

OTHER PUBLICATIONS

Nakama, Shinji; English Translation of JP2006160060A Image Display System, and Image Display Method; Jun. 22, 2006; Espacenet (EPO) (Year: 2006).*

* cited by examiner

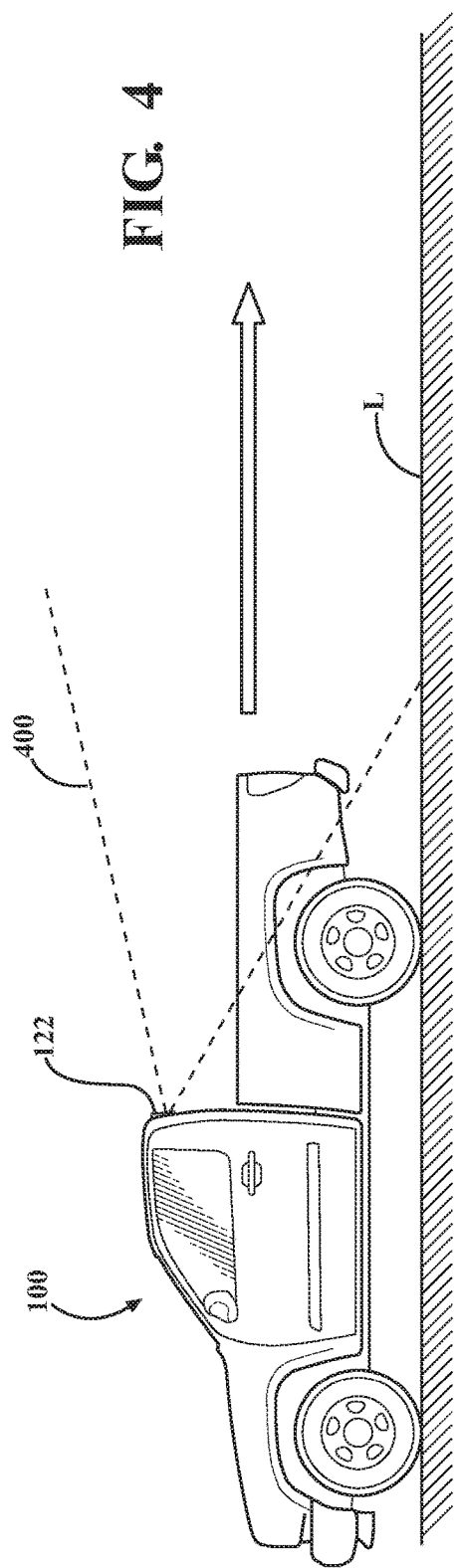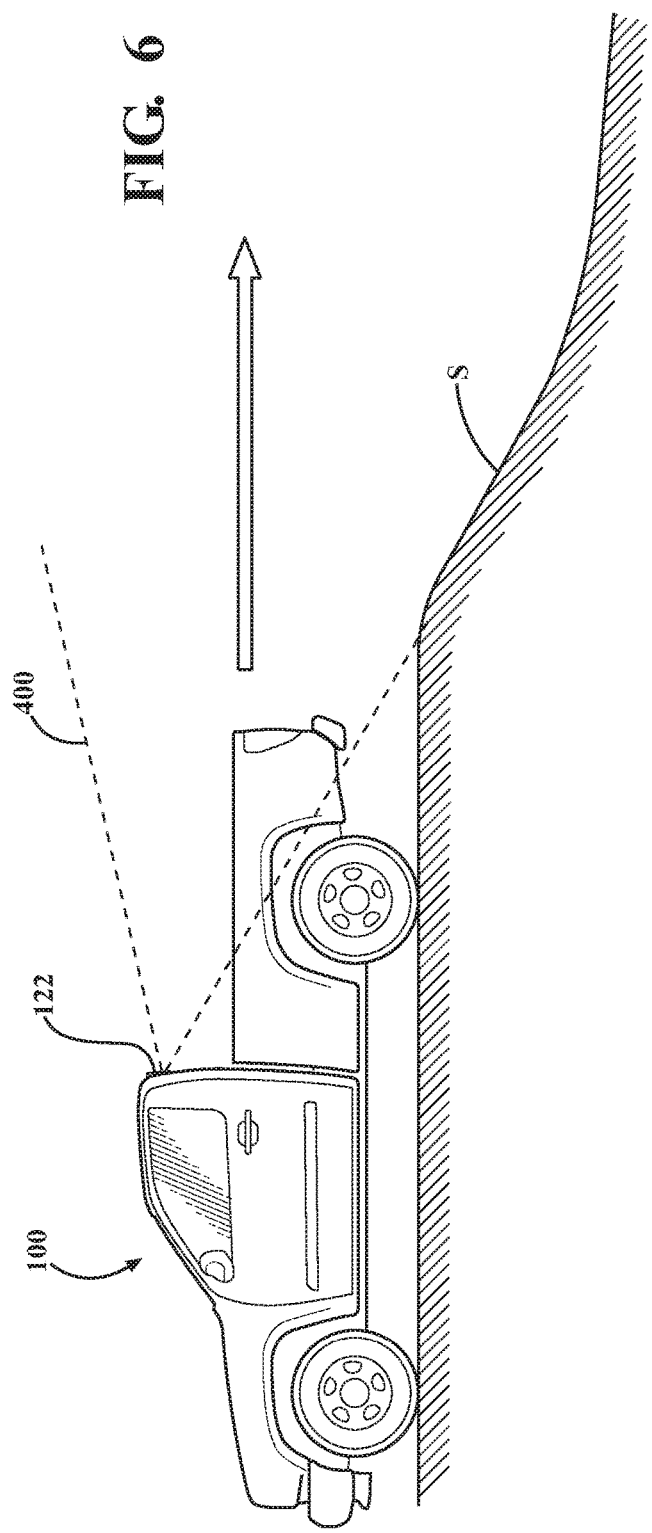

THREE-DIMENSIONAL VEHICLE PATH GUIDELINES

TECHNICAL FIELD

The subject matter described herein relates, in general, to a system and method for determining and displaying a potential path of travel for a vehicle based on a steering angle of the vehicle.

BACKGROUND

Modern vehicles include one or more cameras and display devices that can provide rearward driving assistance. Some vehicles further include cameras that provide forward driving assistance. The vehicles may employ visual overlay graphics that are superimposed on a camera image to provide the driving assistance. However, the visual overlay graphics depicting a potential path of travel in a two-dimensional format may be less than optimal when assistance is needed to ensure that the profile of the vehicle may fit within a space along the potential path.

SUMMARY

In one embodiment, example systems and methods relate to a manner of displaying a field of view of a sensor and overlaying three-dimensional guidelines on the displayed field of view. As noted, the two-dimensional guidelines may not provide adequate assistance to a user navigating a vehicle into a space along a potential path.

In one embodiment, a vehicle guidance system for aiding a user navigating a vehicle is disclosed. The vehicle guidance system includes one or more processors, a memory communicably coupled to the one or more processors and a display device. The memory stores an acquisition module including instructions that when executed by the one or more processors cause the one or more processors to acquire data that specifies a steering angle for the vehicle. The memory stores a guideline determination module including instructions that when executed by the one or more processors cause the one or more processors to determine, based on the data, a left three-dimensional guideline wall and a right three-dimensional guideline wall. The left and right three-dimensional guideline walls each has a height based at least on a height of a portion of the vehicle, and the left and right three-dimensional guideline walls have a distance therebetween based at least on a width of the vehicle. The left and right guideline walls identify a potential path of travel for the vehicle. The display device is configured to display a field of view and the left and right guideline walls, the left and right guideline walls overlaying the field of view.

In one embodiment, a non-transitory computer-readable medium for aiding a user navigating a vehicle and including instructions that when executed by one or more processors cause the one or more processors to perform one or more functions. The instructions include instructions to acquire data that specifies a steering angle for the vehicle. The instructions further include instructions to determine based on the data, a left three-dimensional guideline wall and a right three-dimensional guideline wall. The left and right three-dimensional guideline walls each has a height based at least on a height of a portion of the vehicle, and the left and right three-dimensional guideline walls have a distance therebetween based at least on a width of the vehicle. The left and right guideline walls identify a potential path of travel for the vehicle.

In one embodiment, a method of aiding a user navigating a vehicle is disclosed. In one embodiment, a method includes acquiring data that specifies a steering angle for the vehicle. The method includes determining, based on the data, a left three-dimensional guideline wall and a right three-dimensional guideline wall. The left and right three-dimensional guideline walls each has a height based at least on a height of a portion of the vehicle, and the left and right three-dimensional guideline walls have a distance therebetween based at least on a width of the vehicle. The left and right guideline walls identify a potential path of travel for the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 illustrates one example of a vehicle on a generally level surface that can utilize the vehicle guidance system of FIG. 3.

FIG. 6 illustrates one example of a vehicle on a generally sloped surface that can utilize the vehicle guidance system of FIG. 3.

DETAILED DESCRIPTION

Systems, methods, and other embodiments associated with a manner of displaying three-dimensional guideline walls are disclosed. As noted, using two-dimensional guidelines along a potential path of travel for a vehicle may not provide a driver with guidance relating to whether the vehicle aligns within a space along the potential path.

Accordingly, in one embodiment, the disclosed approach overlays three-dimensional guideline walls, based on a profile of the vehicle, on a camera image to assist the driver in aligning the vehicle within a space. For example, the disclosed approach can assist a driver backing up a pickup truck, to align the truck with a trailer, or more specifically, to align a hitch on the truck to a hitch on the trailer. In such an example, the three-dimensional guideline walls are of a same height and width as sidewalls of the pickup truck, and the guideline walls extend away from the truck and along the potential path based on a steering angle. The position of the guideline walls in relation to other objects in the image may assist the driver in orienting the vehicle to align with the trailer.

In a broad context, the vehicle guidance system can assist a driver navigating through a space, either in a forward direction and/or in a rearward direction. In another embodiment, the disclosed approach may overlay a guideline surface extending from one guideline wall to the other guideline wall on the camera image. As an example, in a forward direction, the guideline surface may be at a height of a front hood of the vehicle, or at a height of a roof of the vehicle. As another example, in a rearward direction, the guideline surface may be at a height of a trunk of the vehicle.

Figure 1:
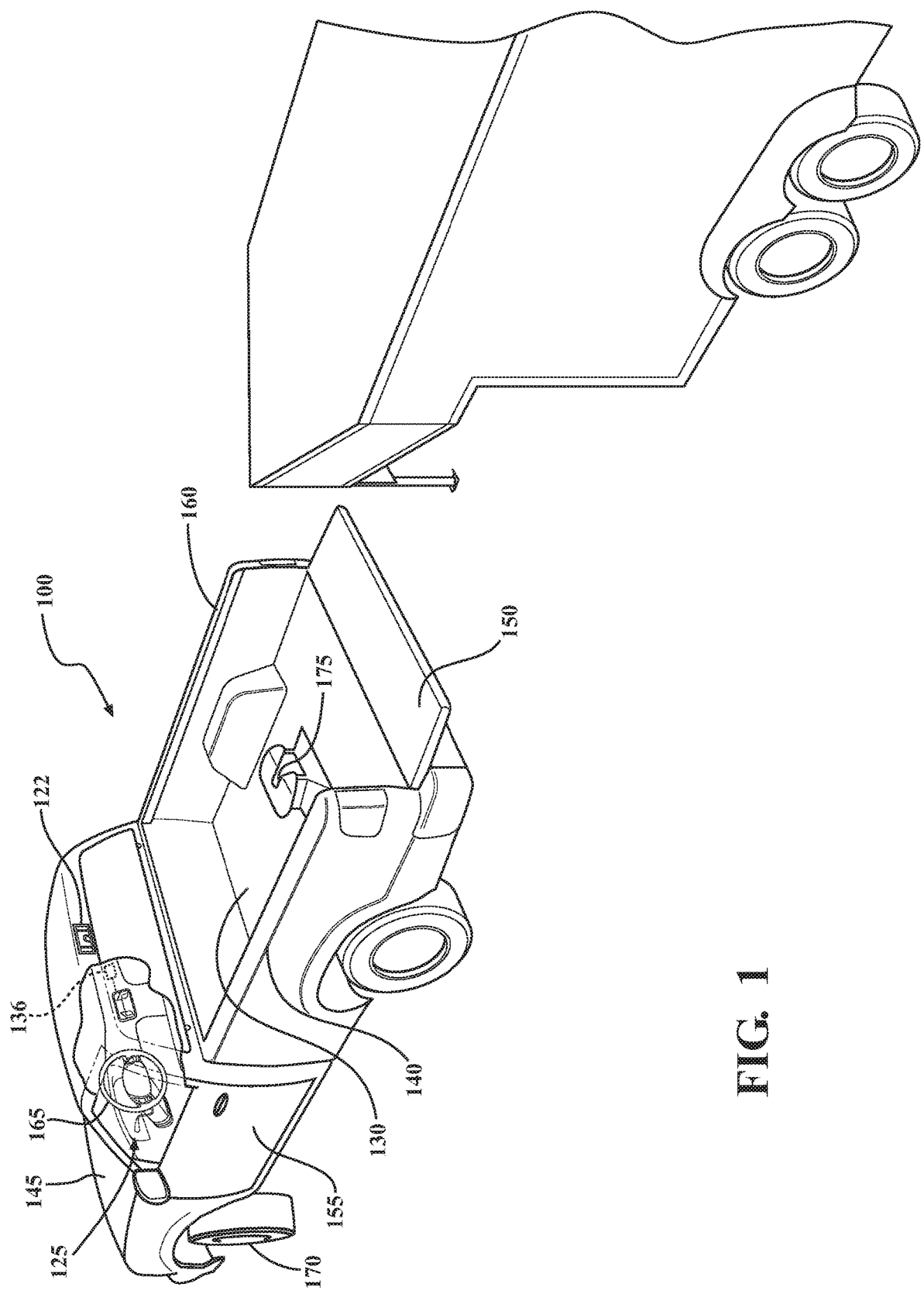
FIG. 1 is a perspective view of a vehicle having a vehicle guidance system, a camera sensor and a display device.

As illustrated in FIG. 1, an exemplary vehicle 100 includes a vehicle guidance system that displays a potential path of travel based on the steering angle of the vehicle 100. Although illustrated as a pickup truck having a truck bed 130 and a hitch 175 located on the truck bed 130, the vehicle 100 may include any passenger or commercial automobile such as a sedan, a sport utility vehicle, a crossover vehicle, a van, a minivan, a bus, etc.

The vehicle has a body 140 with a front 145, a rear 150 spaced from the front 145, a left side 155 and a right side 160 spaced from the left side 155. The terms front 145, rear 150, left side 155 and right side 160 are understood from the perspective of an operator of the vehicle 100 seated in a driver's seat in a standard operating position, i.e., facing a steering wheel 165. The vehicle may have one or more road wheels 170. The vehicle 100 may include a cabin 125. The vehicle 100 may include a camera sensor 122 mounted on an outside portion of the cabin 125. The camera sensor 122 may have a field of view that includes a rear view of the vehicle 100. Additionally, and/or alternatively, the camera sensor 122 may have a field of view that includes a forward view of the vehicle 100. The vehicle 100 may include a display device 136 in the cabin 125 that may display the field of view.

The description of possible elements of the vehicle 100 shown in FIG. 1 will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
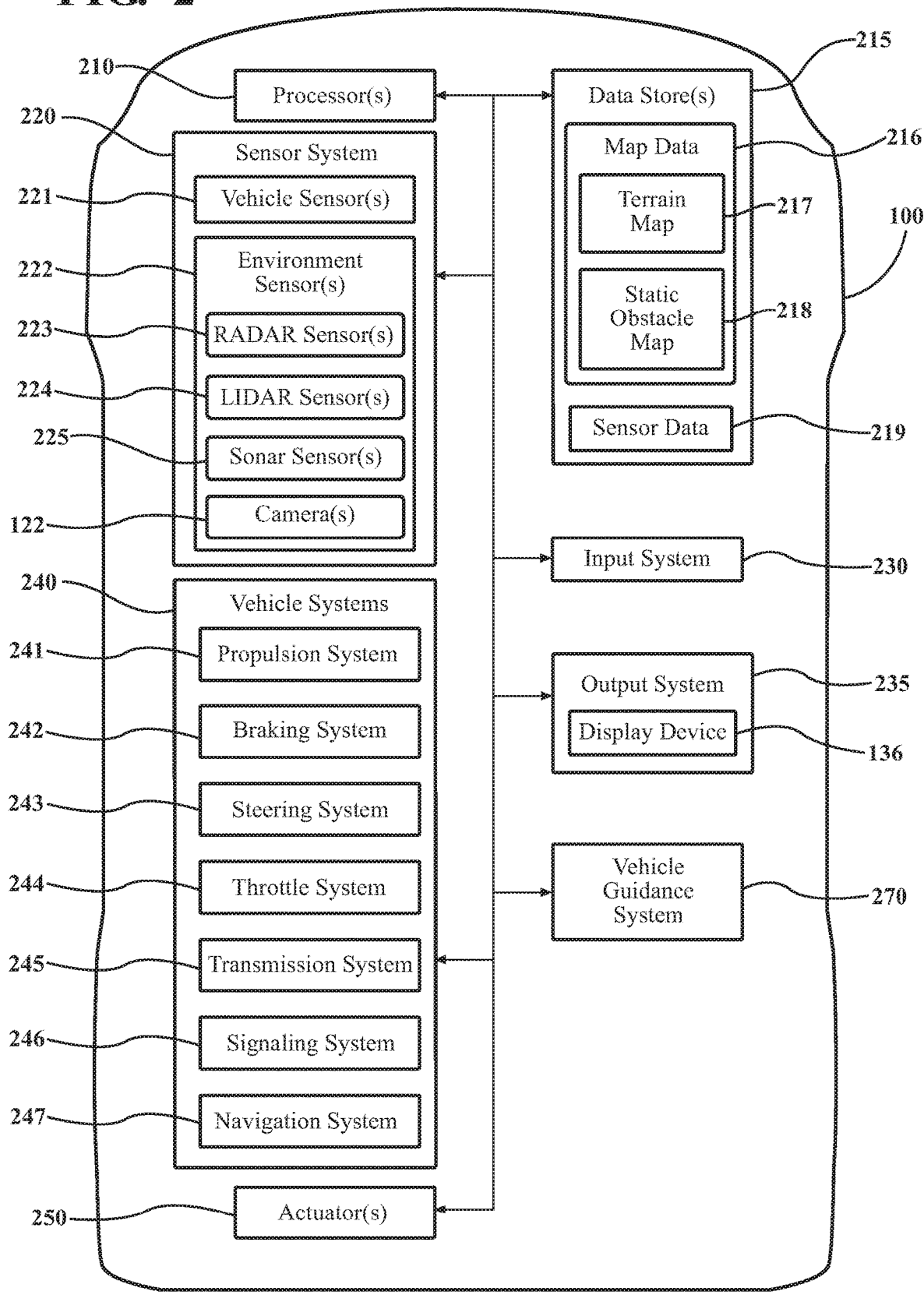
FIG. 2 illustrates one embodiment of a vehicle within which systems and methods disclosed herein may be implemented.

Referring to FIG. 2, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein.

The vehicle 100 includes a sensor system 220, a display device 136 and the vehicle guidance system 270. The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances.

Some of the possible elements of the vehicle 100 are shown in FIG. 2 and will be described along with subsequent figures. However, a description of many of the elements in FIG. 2 will be provided after the discussion of FIGS. 3-8 for purposes of brevity of this description.

In either case, the vehicle 100 includes the vehicle guidance system 270 that is implemented to perform methods and individual functions as disclosed herein relating to displaying three-dimensional guideline walls overlaying a display of a potential path of travel. The noted functions and methods will become more apparent with a further discussion of the figures.

Figure 3:
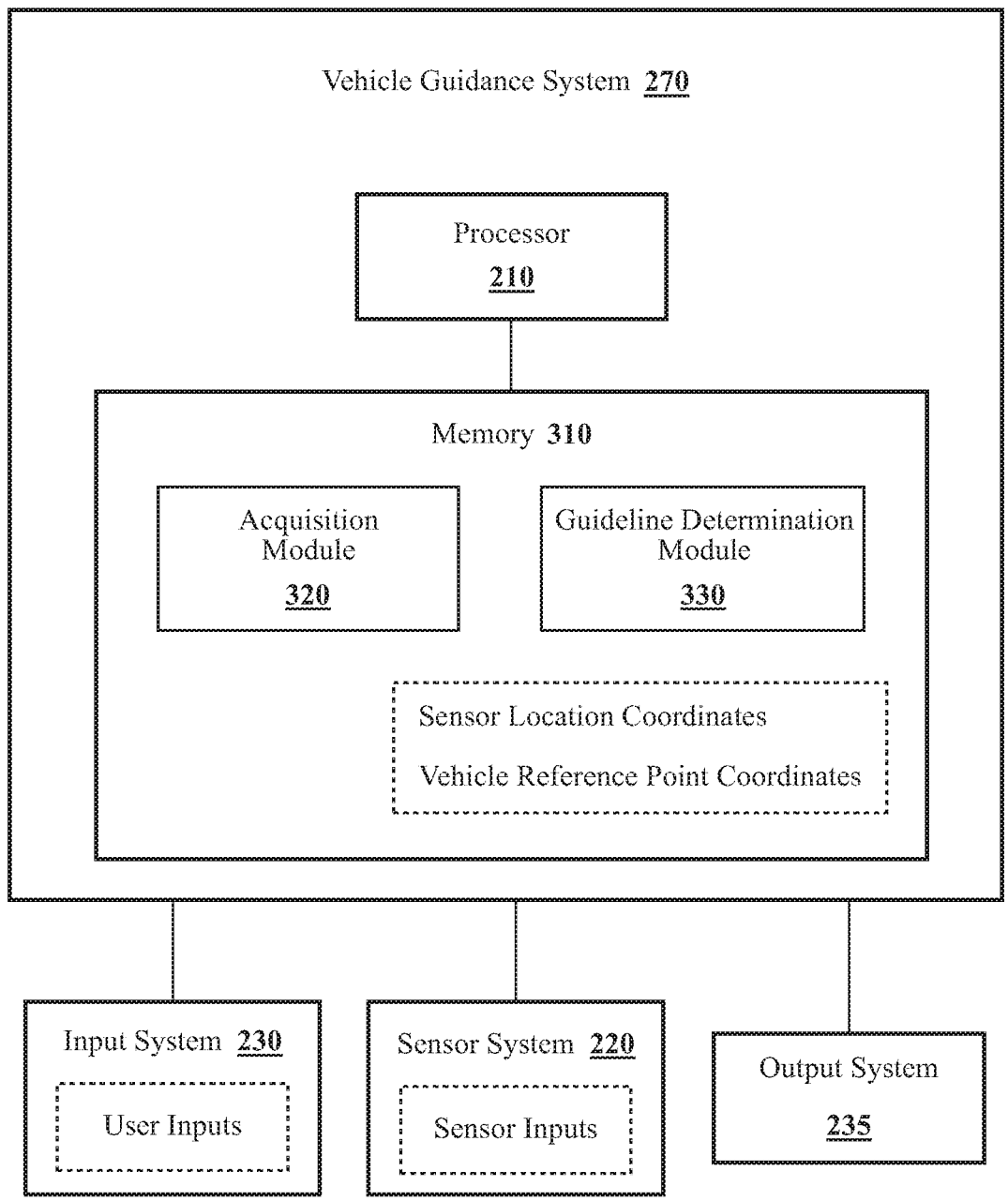
FIG. 3 illustrates one embodiment of a vehicle guidance system that is associated with displaying three-dimensional guideline walls.

With reference to FIG. 3, one embodiment of the vehicle guidance system 270 of FIG. 2 is further illustrated. The vehicle guidance system 270 is shown as including a processor 210 from the vehicle 100 of FIG. 2. Accordingly, the processor 210 may be a part of the vehicle guidance system 270, the vehicle guidance system 270 may include a separate processor from the processor 210 of the vehicle 100, or the vehicle guidance system 270 may access the processor 210 through a data bus or another communication path. In either case, it is generally understood that the processor 210 is a microprocessor or other electronic processing device that is configured with computing resources capable of performing the functions (e.g., executing machine learning algorithms) disclosed herein.

In one embodiment, the vehicle guidance system 270 includes a memory 310 that stores an acquisition module 320 and a guideline determination module 330. The memory 310 may be a random-access memory (RAM), read-only memory (ROM), a hard disk drive, a flash memory, or any other suitable memory for storing the acquisition and guideline determination modules 320, 330. The acquisition and guideline determination modules 320, 330 are, for example, computer-readable instructions that when executed by the processor 210 cause the processor 210 to perform the various functions disclosed herein.

The acquisition module 320 generally includes instructions that function to control the processor 210 to receive data inputs from vehicle sensor(s) (e.g., steering angle sensor) 221 and/or environment sensor(s) 222 of the vehicle. The acquisition module 320, in one embodiment, may receive data inputs in the form of a steering angle of the vehicle 100. In addition, the acquisition module 320 may receive data inputs in the form of a gradient of a road along a potential path of travel. The acquisition module 320 can employ various techniques to acquire the steering angle and/or the road gradient that are either active or passive. For example, the acquisition module 320 may passively sniff the data inputs from a stream of electronic information provided by the various sensors to further components within the vehicle 100. As another example, the acquisition module 320 may actively request and/or poll the steering angle sensor 221 and/or the road gradient sensor 222 for data inputs.

In general, as provided for herein, the acquisition module 320 receives the data specifying the steering angle and/or the road gradient, and transmits the data to the guideline determination module 330.

The guideline determination module 330 generally includes instructions that function to control the processor 210 to determine, based on the data, a left three-dimensional guideline wall and a right three-dimensional guideline wall. The guideline determination module 330 determines the left and right three-dimensional guideline walls by determining a height, width, length, curvature, and position of the three-dimensional guideline walls as well as a distance between the three-dimensional guideline walls. Each of the height, width, length, curvature, position and distance are explained in detail below.

The guideline determination module 330 determines, or in other words, calculates the height, width, length, curvature, position, and/or distance, based on sensor location coordinates, vehicle reference point coordinates and/or user inputs.

The sensor location coordinates and the vehicle reference point coordinates may be set during manufacturing, and the coordinates may be stored in the memory 310 and/or programmed into the guideline determination module 330. Alternatively, in the case of the sensor location coordinates, the guideline determination module 330 may communicate with a sensor 220, requesting and receiving the sensor location coordinates. In another example, the vehicle 100 may have markers on the body 140 of the vehicle 100 and the sensor(s) 220 may detect and determine coordinates of the markers as the vehicle reference point coordinates. In another example, the vehicle reference point coordinates may be based on dimensions (e.g., height, width) of the vehicle 100.

The guideline determination module 330 may measure the distance between the vehicle reference points to determine the height, width, position of and/or distance between the three-dimensional guideline walls. The height, width, position of and/or distance between the three-dimensional guideline walls may be outputted to the display device 136 as calculated. Alternatively, the height, width, position, and distance may be adjusted by the user via an input system 230. In such a case, the guideline determination module 330 may adjust the height and width by increasing or reducing the dimensions, and may adjust the position and distance by moving the three-dimensional guideline walls upwards, downwards, inwards or outwards. The guideline determination module 330 may output the adjusted height, width, position of and/or distance between the guideline walls to the output system 235 and/or the display device 136.

The guideline determination module 330 calculates the curvature of the guideline walls based on the steering angle. In one embodiment, the guideline determination module 330 may calculate the curvature of the guideline walls based on various factors including a distance between a vehicle center of gravity and a front wheel 170, a distance between the vehicle center of gravity and a rear wheel 170, and a gradient of the road along the potential path of travel. The guideline determination module 330 may determine the curvature of the three-dimensional guideline walls using any suitable algorithm.

The guideline determination module 330 determines the length of the three-dimensional guideline walls. The length is further described below. The guideline determination module 330 may determine the length based on manufacturer's settings and/or user input.

In one embodiment, the guideline determination module 330 may determine a slope along the length of the three-dimensional guideline walls based on the road gradient. In such an embodiment, the guideline determination module 330 may receive the road gradient values from a sensor such as a LiDAR sensor.

The color of the left and right guideline walls may vary based on at least one of a direction and a curvature of the potential path. In other words, the guideline determination module 330 may assign the guideline walls colors based on a forward direction or a rearward direction. Further, the guideline determination module 330 may assign the guideline walls colors based on the curvature. As an example, where the curvature of a guideline wall is veering leftwards or rightwards, the guideline determination module 330 may assign the curvature a first color, as an example, yellow. However, when the curvature is generally straight and facing rearwards (i.e., not veering either leftwards or rightwards), the guideline determination module 330 may assign the trajectory a second color, e.g., white. Other suitable color schemes representative of other directions (e.g., sloping upward or downward) are also possible.

FIG. 4 illustrates an example where the vehicle 100 is moving in a rearward direction on a generally level ground plane L. As an example and as shown, a camera sensor 122 may have a field of view 400 that includes a rearview of the vehicle 100.

Figure 5A:
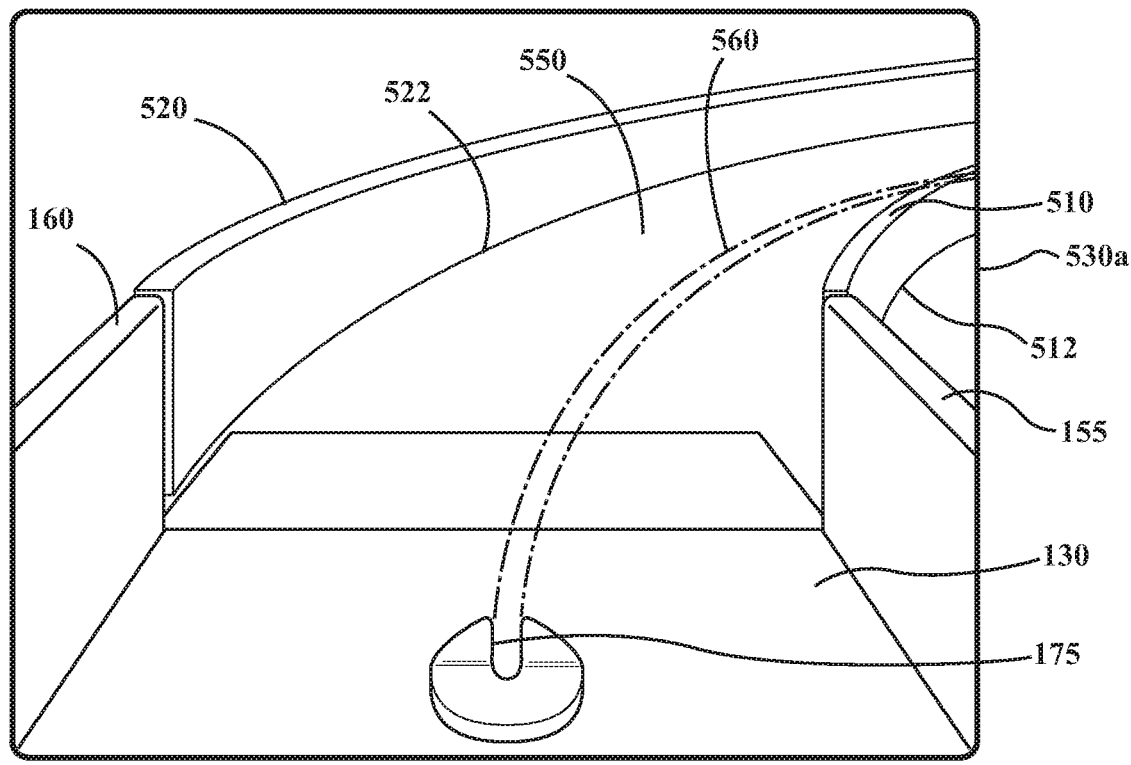
FIGS. 5A-5C illustrate an exemplary display device displaying a field of view of the vehicle of FIG. 4 (on a level surface) and example guideline walls overlaying the field of view.
Figure 5B:
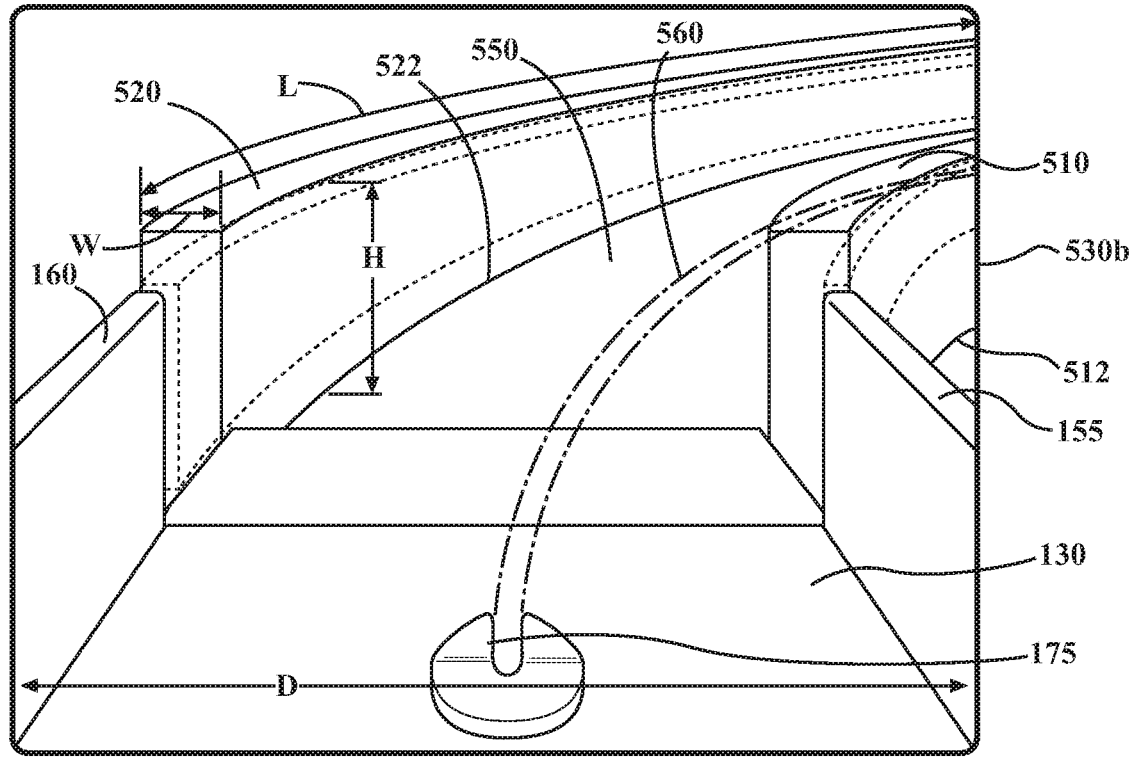
Figure 5C:
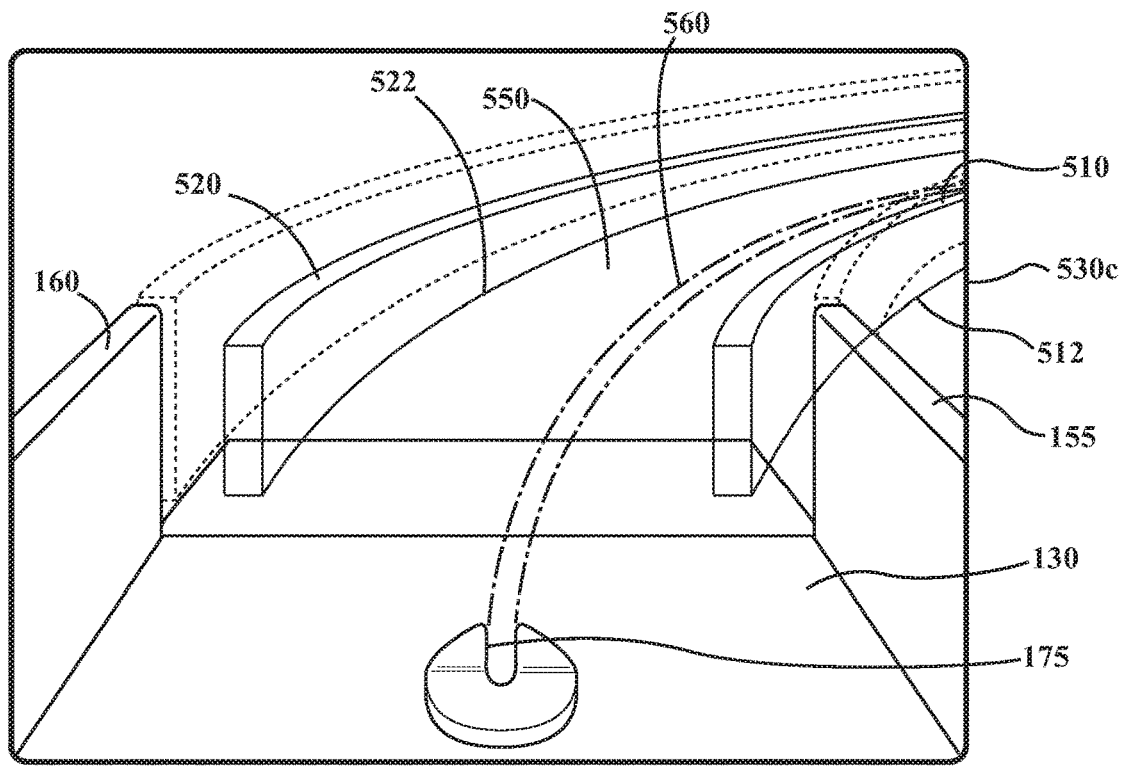

FIGS. 5A-5C illustrate example images displayed on a screen of the display device 136 related to the vehicle 100 moving in the rearward direction on the generally level ground plane L.

As shown in FIGS. 5A-5C, the images 530 on the display device 136 may depict the camera sensor's 122 field of view 400, and show a rearview of the vehicle 100. Additionally, the image 530 may include left and right three-dimensional guideline walls 510, 520, where the left and right three-dimensional guideline walls 510, 520 overlay the field of view 400, and based on the data specifying the steering angle, identify a potential path of travel for the vehicle 100.

The left and right three-dimensional guideline walls 510, 520 may each have a height H based at least on a height of a portion of the vehicle 100. As an example and as shown in FIGS. 5A-5C, the height H of the three-dimensional guideline walls 510, 520 may extend vertically from the truck bed to the height of the sidewalls of a truck. Alternatively and as another example, the height H of the three-dimensional guideline walls 510, 520 may extend vertically from a lower portion of a vehicle 100 to the height of the roof of the vehicle 100.

The left and right three-dimensional guideline walls 510, 520 may each have a width W. As an example and as shown in FIGS. 5A-5C, the width W of the three-dimensional guideline walls 510, 520 may extend horizontally along the width of the sidewalls of a truck. Alternatively and as another example, the width W of the three-dimensional guideline walls 510, 520 may extend horizontally to a default setting such as a manufacturer's setting, a value programmed into memory, or a value inputted by the user. As such, in a case where the vehicle 100 is a sedan, the width W may be set to the default setting.

The left and right three-dimensional guideline walls 510, 520 may have a distance D between each other. The distance D may be based at least on a width of the vehicle 100. As an example, the distance D may extend from an inner portion of the left three-dimensional guideline wall to an inner portion of the right three-dimensional guideline wall such that the left and right three-dimensional guideline walls align with the left and right sides of the vehicle.

The left and right three-dimensional guideline walls 510, 520 may each have a length L. As an example and as shown in FIGS. 5A-5C, the length L of the three-dimensional guideline walls 510, 520 may extend from the rear of the vehicle 100 in a direction of the curvature. In other words, the length of each of the left and right guideline walls 510, 520 is a curvature based on each guideline wall 510, 520 extending from the vehicle 100 along the potential path of travel as determined by the guideline determination module 330. The length L of the three-dimensional guideline walls 510, 520 may extend to a default length such as a length set by the manufacturer or programmed into memory. The length may also be adjustable based on user input.

The left and right three-dimensional guideline walls 510, 520 may each have a position defined in relation to the vehicle 100. In other words, each of the left and right three-dimensional guideline walls 510, 520 may be positioned such that the left and right guideline walls are located relative to the left and right sides of the vehicle 100, respectively. As a default, the position of the three-dimensional guideline walls 510, 520 may align with the sides of the vehicle 100 or at a position set by the manufacturer or programmed into memory. The position may also be adjustable based on user input, as explained below.

As shown in FIG. 5A, the image 530a may depict a surface 550 extending from the left guideline wall 510 to the right guideline wall 520. In one embodiment, the surface 550 may extend from a lower portion 512 of the left guideline wall 510 to a lower portion 522 of the right guideline wall 520. In another embodiment, the vehicle 100 may be a pickup truck having a truck bed 130 and a hitch 175 located on the truck bed, and in such an embodiment, an additional three-dimensional wall 560 may extend from the hitch 175 toward the potential path.

As shown in FIG. 5B, the height and the width of each of the guideline walls 510, 520 may be adjustable by the user. As an example, the user may adjust each of the height and width via the input system 230, such as a slidable button or a rotatable knob. The input system 230 may include an actuator (not shown) that is communicatively coupled to the vehicle guidance system 270. The actuator may send a signal to the vehicle guidance system 270 whenever the input system 230 detects an adjustment, and the vehicle guidance system 270, specifically, the guideline determination module 330, may, in response to the signal, adjust the height and/or width of the guideline wall 510, 520.

As an example and as shown in FIG. 5B, if the input system 230 detects a height increasing adjustment, the height of the guideline walls 510, 520 would increase, and when the input system 230 detects a width increasing adjustment, the width of the guideline walls 510, 520 would increase. Similarly and as an example, if the input system 230 detects a height decreasing adjustment, the height of the guideline walls 510, 520 would decrease, and when the input system 230 detects a width decreasing adjustment, the width of the guideline walls 510, 520 would decrease. The heights and widths of the left and right guideline walls 510, 520 may increase or decrease together or independent of each other.

As another example and as shown in FIG. 5C, a position of each of the guideline walls 510, 520 may be vertically and/or horizontally adjustable by the user. As an example and as shown in FIG. 5C, if the input system 230 detects an inwards adjustment, the guideline walls 510, 520 may move inwards and towards a longitudinal axis T, and when the input system 230 detects an outwards adjustment, the guideline walls 510, 520 may move outwards and away from the longitudinal axis T. Similarly and as an example, if the input system 230 detects an upwards adjustment, the guideline walls 510, 520 would move upwards, and when the input system 230 detects a downwards adjustment, the guideline walls 510, 520 would move downwards. The left and right guideline walls 510, 520 may move inwards, outwards, upwards, or downwards together or independent of each other.

Figure 7:
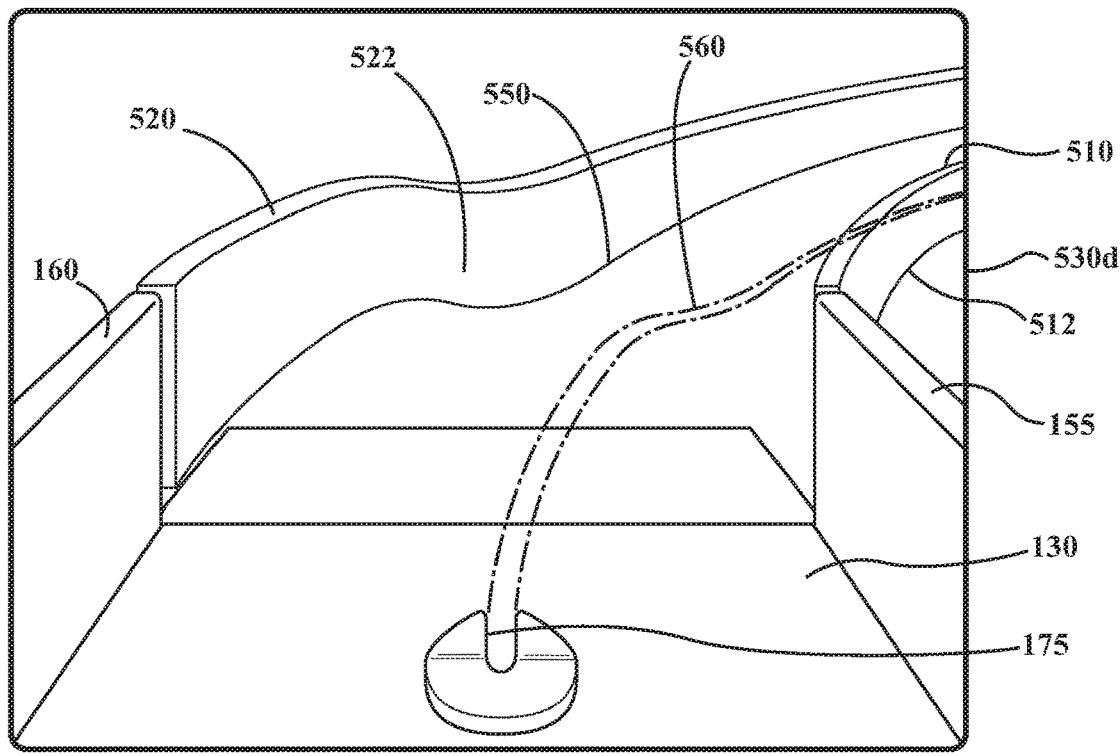
FIG. 7 illustrates an exemplary display device displaying a field of view of the vehicle of FIG. 6 (on a sloped surface) and example guideline walls overlaying the field of view.

FIG. 6 illustrates an example where the vehicle 100 is moving in a rearward direction on a sloped ground plane S, and FIG. 7 illustrates an example image displayed on a screen of a display device 136 related to the vehicle 100 moving in the rearward direction on the sloped ground plane S.

In an example as shown in FIG. 6, the vehicle 100 may be moving rearwards along the sloped ground plane, and in such an example as shown in FIG. 7, the guideline determination module 330 may consider the gradient of the sloped ground plane in calculating the curvature of the guideline walls 510, 520, and the guideline walls 510, 520 may be sloped accordingly.

As shown in FIG. 7, the image 530d on the display device 136 may depict a camera sensor's 122 field of view 400, and show a rearview of the vehicle 100. Additionally, the image 530d may include the left and right three-dimensional guideline walls 510, 520, where the left and right three-dimensional guideline walls 510, 520 overlay the field of view 400, and based on the data specifying the steering angle as well as a gradient of a sloped ground plane, identify a potential path of travel for the vehicle 100, including a slope in the curvature.

Figure 8:
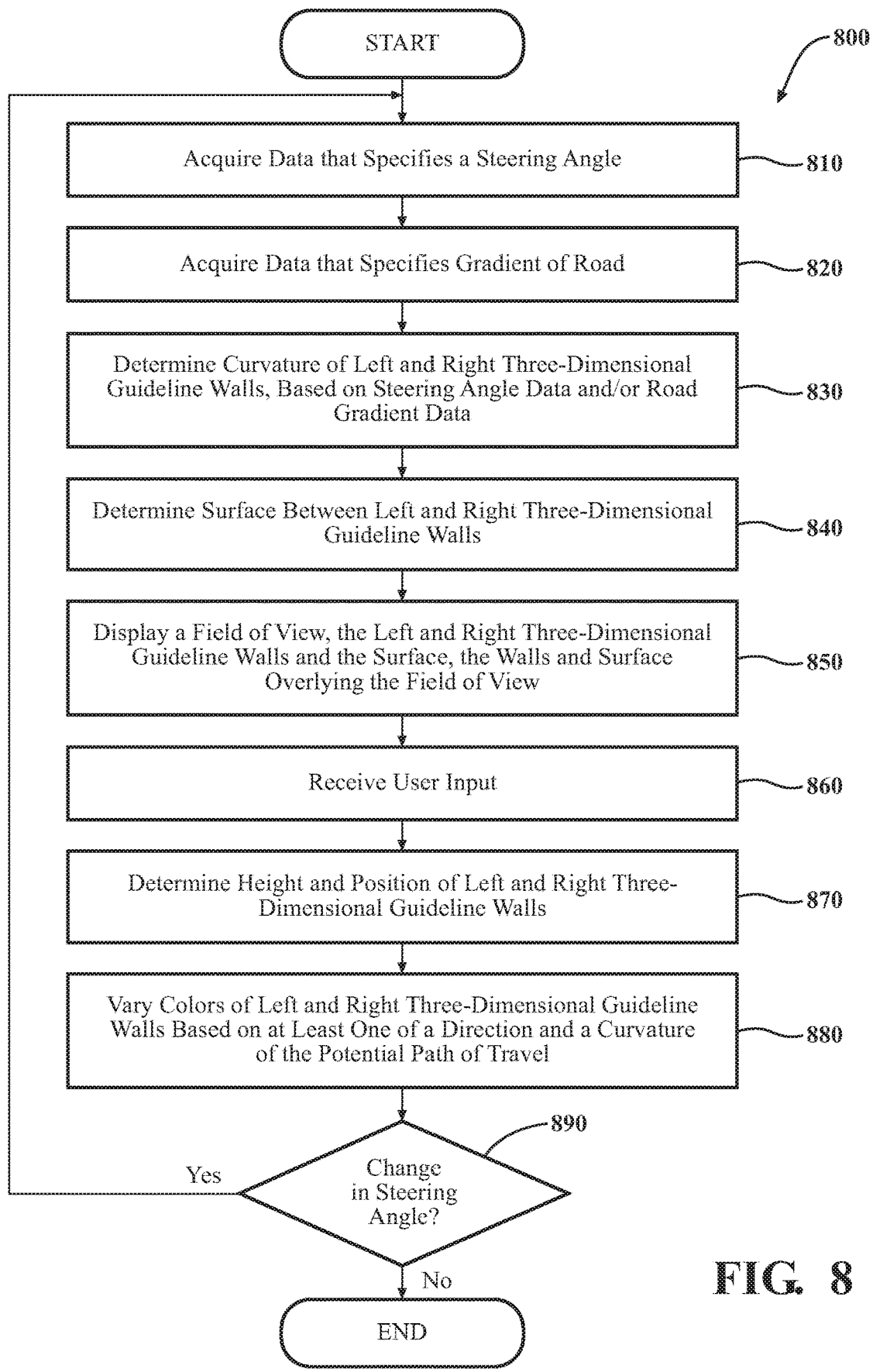
FIG. 8 illustrates one embodiment of a method associated with determining three-dimensional guideline walls.

FIG. 8 illustrates a flowchart of a method 800 that is associated with determining the dimensions and curvature of the guideline walls 510, 520. Method 800 will be discussed from the perspective of the vehicle guidance system 270 of FIG. 3. While method 800 is discussed in combination with the vehicle guidance system 270, it should be appreciated that the method 800 is not limited to being implemented within the vehicle guidance system 270, but is instead one example of a system that may implement the method 800.

At 810, the acquisition module 320 acquires data that specifies the steering angle of the vehicle 100. As previously described, the acquisition module 320 may passively or actively acquire the steering angle data. As an example, in a passive manner, the acquisition module 320 may monitor a CAN bus for steering angle data, and retrieve the data from the CAN bus as the data becomes available. As another example, in an active manner, the acquisition module 320 may query the steering angle sensor 221 directly or indirectly for the steering angle. The acquisition module 320 may continually acquire data and in response to a change in the steering angle, update the steering angle data. The steering angle may be measured in degrees or any reasonable unit.

At 820, as an option, the acquisition module 320 may receive data identifying the gradient of a road L, S along the potential path of travel. Similar to the steering angle data, the acquisition module 320 may passively or actively acquire the gradient data. As an example, in a passive manner, the acquisition module 320 may monitor a CAN bus for gradient data, and retrieve the data from the CAN bus as the data becomes available. As another example, in an active manner, the acquisition module 320 may query a road gradient sensor directly or indirectly for the gradient. The acquisition module 320 may continually acquire data and in response to a change in the gradient, update the gradient data. The gradient may be measured in degrees or any reasonable unit.

At 830, the guideline determination module 330 may determine the curvature and the slope of the curvature of the guideline walls 510, 520 based on the received steering angle and the gradient. As an example, in a vehicle 100 with a front-wheel drive, when the steering angle indicates that the vehicle 100 is being steered to the left, the curvature may extend from the rear of the vehicle 100 in a curved formation towards the left. Similarly, when the steering angle indicates that the vehicle 100 is being steered to the right, the curvature may extend from the rear of the vehicle 100 in a curved formation towards the right. The curvature may be defined by a radius of the curvature, which may be determined based on the steering angle. The curvature may be further defined by the road gradient. As an example of such a case, the curvature may slope in a manner that matches the road gradient.

At 840, the guideline determination module 330 may determine a surface 550 extending between the left and right three-dimensional guideline walls 510, 520. As an example, the surface 550 may extend from a lower portion 512 of the left three-dimensional guideline wall 510 to a lower portion 522 of the right three-dimensional guideline wall 520. In such an example, the surface 550 may be level with a floor of the vehicle 100. As another example, the surface 550 may extend from an upper portion of the left three-dimensional guideline wall 510 to an upper portion of the right three-dimensional guideline wall 520. In such an example, the surface 550 may be level with a roof of the vehicle 100.

At 850, the guideline determination module 330 may transmit coordinates for the left and right three-dimensional guideline walls 510, 520 to the display device 136. The display device 136 may display a field of view 400 of a sensor 222 such as a camera sensor 122. In one example, the camera sensor 122 may be rear-facing relative the vehicle 100. Additionally or alternatively, the camera sensor 122 may be forward-facing relative to the vehicle 100. Based on the coordinates received from the guideline determination module 330, the display device 136 may display the left and right three-dimensional guideline walls 510, 520 over the field of view 400. In other words, the display device 136 may superimpose the left and right three-dimensional guideline walls 510, 520 over the field of view 400 of the sensor 222.

At 860, the acquisition module 320 may receive user input, relating to adjustments to the height, the width, and/or the position of the guideline walls 510, 520, as well as the distance between the guideline walls 510, 520. The user input may be received via the input system 230 when the user touches a user interface device such as an adjustable knob, slide, or a touchscreen. The user interface device may transmit the user input to the vehicle guidance system 270, specifically, to the acquisition module 320.

At 870, the guideline determination module 330 may receive user input data from the acquisition module 320. The height, the width, and/or the position of the guideline walls 510, 520, as well as the distance between the guideline walls 510, 520 may each have a default setting based on the vehicle reference points (such as the dimensions of the sides 155, 160 of the vehicle 100) as stored and/or programmed into memory 310. Based on the user inputs, the guideline determination module 330 may adjust the height, width, and/or position of the left and right guideline walls 510, 520 and/or distance between the left and right guideline walls 510, 520. As an example, the height, width, and/or position of the guideline walls 510, 520 and/or the distance between the guideline walls 510, 520 may default to programmed settings and/or may be adjusted by the user via the input system 230 by increasing or reducing the height and/or the width of the guideline walls 510, 520 and/or elevating or lowering the position of the guideline walls 510, 520.

At 880, the guideline determination module may vary colors of the left and right three-dimensional guideline walls 510, 520 based on at least one of a direction and a curvature of the potential path of travel. As an example, when there is a curvature in the potential path of travel, e.g., the vehicle 100 is veering rightwards, the guideline determination module 330 may assign the left and right three-dimensional guideline walls 510, 520 a first color, e.g., yellow, and when there is no curvature, i.e. the vehicle 100 is not veering either leftwards or rightwards, the guideline determination module 330 may assign the left and right three-dimensional guideline walls a second color, e.g., white. Other suitable color schemes representative of other directions (e.g., sloping upward or downward) are also possible.

At 890, in response to receiving an update in at least, one of the steering angle, the road gradient and the input system 230, the guideline determination module 330 may re-determine the dimensions, position, and/or curvature of the guideline walls 510, 520 based on the updated data.

FIG. 1 will now be discussed in full detail as an example environment within which the system and methods disclosed herein may operate.

The vehicle 100 can include one or more processors 210. In one or more arrangements, the processor(s) 210 can be a main processor of the vehicle 100. For instance, the processor(s) 210 can be an electronic control unit (ECU). The vehicle 100 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

In one or more arrangements, the map data 216 can include one or more terrain maps 217. The terrain map(s) 217 can include information about the ground, terrain, roads, surfaces, and/or other features of one or more geographic areas. The terrain map(s) 217 can include elevation data in the one or more geographic areas. The map data 216 can be high quality and/or highly detailed. The terrain map(s) 217 can define one or more ground surfaces, which can include paved roads, unpaved roads, land, and other things that define a ground surface.

In one or more arrangements, the map data 216 can include one or more static obstacle maps 218. The static obstacle map(s) 218 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 218 can have location data, size data, dimension data, material data, and/or other data associated with it. The static obstacle map(s) 218 can include measurements, dimensions, distances, and/or information for one or more static obstacles. The static obstacle map(s) 218 can be high quality and/or highly detailed. The static obstacle map(s) 218 can be updated to reflect changes within a mapped area.

The one or more data stores 215 can include sensor data 219. In this context, "sensor data" means any information about the sensors that the vehicle 100 is equipped with, including the capabilities and other information about such sensors. As will be explained below, the vehicle 100 can include the sensor system 220. The sensor data 219 can relate to one or more sensors of the sensor system 220. As an example, in one or more arrangements, the sensor data 219 can include information on one or more LIDAR sensors 224 of the sensor system 220.

In some instances, at least a portion of the map data 216 and/or the sensor data 219 can be located in one or more data stores 215 located onboard the vehicle 100. Alternatively, or in addition, at least a portion of the map data 216 and/or the sensor data 219 can be located in one or more data stores 215 that are located remotely from the vehicle 100.

As noted above, the vehicle 100 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor(s) 210, the data store(s) 215, and/or another element of the vehicle 100 (including any of the elements shown in FIG. 2). The sensor system 220 can acquire data of at least a portion of the external environment of the vehicle 100 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 100 itself. In one or more arrangements, the vehicle sensor(s) 221 can be configured to detect, and/or sense position and orientation changes of the vehicle 100, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 100. In one or more arrangements, the vehicle sensor(s) 221 can include a speedometer to determine a current speed of the vehicle 100.

The vehicle sensors 221 may include a steering angle sensor. The term "steering angle" can refer to an angle between a longitudinal axis of the body 140 of the vehicle 100 and a steered road wheel 170 of the vehicle 100. For example, when a steered road wheel 170 is parallel to the longitudinal axis of the vehicle 100, the steering angle is zero degrees (when measured in degrees). When the steered road wheel 170 is turned 25 degrees left relative to a heading and the longitudinal axis of the vehicle 100, the steering angle is 25 degrees. When the steered road wheel 170 is turned 25 degrees right relative to the heading and the longitudinal axis of the vehicle 100, the steering angle is −25 degrees.

The steering angle sensor can be of any variety of known types. For example, the steering angle sensor can rotationally engage a steering wheel and/or a steering column to determine the steering angle. In another example, the steering angle sensor may include a mechanical coupling such as a bearing and an electronic component, e.g., an optical sensor, a resistive transducer, etc., to determine the steering angle. As discussed above, the steering angle sensor can provide data to the processor 210, such as the steering angle, via, e.g., the CAN bus.

By way of example, and not limitation, the steering angle sensor may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc.

Alternatively, or in addition, the sensor system 220 can include one or more environment sensors 222 configured to acquire, and/or sense driving environment data. "Driving environment data" includes data or information about the external environment in which the vehicle 100 is located or one or more portions thereof. For example, the one or more environment sensors 222 can be configured to detect, quantify and/or sense obstacles in at least a portion of the external environment of the vehicle 100 and/or information/data about such obstacles. Such obstacles may be stationary objects (e.g., a road, potholes, dips, bumps, changes in a gradient of the road, etc.) and/or dynamic objects (e.g., other vehicles, pedestrians, etc.). The one or more environment sensors 222 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The environment sensors 222 may be disposed on a top of the vehicle 100, in front of a vehicle front windshield, behind a vehicle rear windshield, and/or around the vehicle 100. The environment sensor 222 has a field of view 540 relating to where the environment sensor 222 is positioned.

As an example, an environment sensor 222 such as a camera, disposed in front of the vehicle front windshield and facing the forward direction, will have a forward view of the vehicle 100. As another example, an environment sensor 222, disposed behind the vehicle rear windshield, will have a rear view of the vehicle 100.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 can include one or more radar sensors 223, one or more LIDAR sensors 224, one or more sonar sensors 225, and/or one or more camera sensors 122. In one or more arrangements, the one or more camera sensors 122 can be high dynamic range (HDR) cameras or infrared (IR) cameras.

The vehicle 100 can include an input system 230. An "input system" includes any device, component, system, element or arrangement or groups thereof that enable information/data to be entered into a machine. The input system 230 can receive an input from a vehicle passenger (e.g., a driver or a passenger). The vehicle 100 can include an output system 235. An "output system" includes any device, component, or arrangement or groups thereof that enable information/data to be presented to a vehicle passenger (e.g., a person, a vehicle passenger, etc.).

An output system 235 may include the display device 136. The display device 136 presents information to and may receive information from the user of the vehicle 100. The display device 136 may be located wherever the display device 136 may be readily seen by the user, e.g., on an instrument panel in an occupant cabin of the vehicle, or on a rearview mirror. In an embodiment where the vehicle 100 is remote-controlled, the display device 136 may be located outside the vehicle 100. As an example, the display device 136 may include a Human Machine Interface (HMI). The display device 136 may include dials, digital readouts, screens, speakers, and so on for providing information to the occupant. The display device 136 may include buttons, knobs, keypads, a microphone, a touchscreen, an interactive voice response (IVR) system, and so on for receiving information from the occupant. The display device 136 may have, e.g., a soft key or a push button to send signals to the vehicle guidance system 270. For example, the signals may include notifications to the vehicle guidance system 270 to adjust the dimensions and/or positioning of the three-dimensional guidelines.

The vehicle 100 can include one or more vehicle systems 240. Various examples of the one or more vehicle systems 240 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 100 and/or to determine a travel route for the vehicle 100. The navigation system 247 can include one or more mapping applications to determine a travel route for the vehicle 100. The navigation system 247 can include a global positioning system, a local positioning system or a geolocation system.

The vehicle 100 can include one or more actuators 250. The actuators 250 can be any element or combination of elements operable to modify, adjust and/or alter one or more of the vehicle systems 240 or components thereof to responsive to receiving signals or other inputs from the processor(s) 210. Any suitable actuator can be used. For instance, the one or more actuators 250 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle guidance system for aiding a user navigating a vehicle, comprising:
   one or more processors;
   a memory communicably coupled to the one or more processors and storing:
      an acquisition module including instructions that when executed by the one or more processors cause the one or more processors to acquire data that specifies a steering angle for the vehicle; and
      a guideline determination module including instructions that when executed by the one or more processors cause the one or more processors to determine, based on the steering angle data, a left three-dimensional guideline wall and a right three-dimensional guideline wall that together identify a potential path of travel for the vehicle, and determine a curvature of the left and right three-dimensional guideline walls based on a gradient of a road along the potential path of travel, wherein the left and right three-dimensional guideline walls each have a height based at least on a height of a portion of the vehicle and are adjustable by the user via a user interface device located on an instrument panel of the vehicle, and wherein the left and right three-dimensional guideline walls have a distance therebetween based at least on a width of the vehicle; and
   a display device configured to display a field of view exterior to the vehicle and the left and right three-dimensional guideline walls, wherein the left and right three-dimensional guideline walls overlay the field of view, and wherein the curvature of the left and right three-dimensional guideline walls is continually updated on the display device in response to detected changes in the gradient.

2. The vehicle guidance system of claim 1, wherein the guideline determination module further includes instructions to determine a width of each of the left and right three-dimensional guideline walls.

3. The vehicle guidance system of claim 2, wherein each of a position and the width of the left and right three-dimensional guideline walls is adjustable by the user.

4. The vehicle guidance system of claim 1, wherein the left and right three-dimensional guideline walls are spaced from each other and wherein the guideline determination module further includes instructions to determine a surface extending between the left three-dimensional guideline wall and the right three-dimensional guideline wall, and wherein the display device is further configured to display the surface by overlaying the surface on the field of view.

5. The vehicle guidance system of claim 1, wherein:
the acquisition module further includes instructions to, in response to a change in the steering angle, acquire updated data specifying the change in the steering angle; and
the guideline determination module further includes instructions to determine, based on the updated data, the left and right three-dimensional guideline walls.

6. The vehicle guidance system of claim 1, wherein a color of the left and right three-dimensional guideline walls varies based on at least one of a direction and a curvature of the potential path of travel.

7. The vehicle guidance system of claim 1, wherein the field of view is obtained from a camera sensor mounted on the vehicle.

8. The vehicle guidance system of claim 1, wherein the field of view includes at least one of a rear view of the vehicle and a forward view of vehicle.

9. A method of aiding a user navigating a vehicle, comprising:
acquiring data that specifies a steering angle for the vehicle;
determining, based on the steering angle data, a left three-dimensional guideline wall and a right three-dimensional guideline wall that together identify a potential path of travel for the vehicle, and determine a curvature of the left and right three-dimensional guideline walls based on a gradient of a road along the potential path of travel, wherein the left and right three-dimensional guideline walls each have a height based at least on a height of a portion of the vehicle and are adjustable by the user via a user interface device located on an instrument panel of the vehicle, and wherein the left and right three-dimensional guideline walls have a distance therebetween based at least on a width of the vehicle; and
configuring a display device to display a field of view exterior to the vehicle and the left and right three-dimensional guideline walls, wherein the left and right three-dimensional guideline walls overlay the field of view, and wherein the curvature of the left and right three-dimensional guideline walls is continually updated on the display device in response to detected changes in the gradient.

10. The method of claim 9, further comprising determining a width of the left and right three-dimensional guideline walls.

11. The method of claim 9, wherein the left and right three-dimensional guideline walls are spaced from each other, the method further comprising:
determining a surface extending between the left three-dimensional guideline wall and the right three-dimensional guideline wall, and
displaying the surface by overlaying the surface on the field of view.

12. The method of claim 9, further comprising determining the left and right three-dimensional guideline walls based on a gradient of a road along the potential path of travel.

13. The method of claim 9, further comprising, in response to a change in the steering angle, acquiring updated data specifying the change in the steering angle; and
determining, based on the updated data, the left and right three-dimensional guideline walls.

14. The method of claim 9, wherein a color of the left and right three-dimensional guideline walls varies based on at least one of a direction and a curvature of the potential path of travel.

15. A vehicle guidance system for aiding a user navigating a vehicle, comprising:
one or more processors;
a memory communicably coupled to the one or more processors and storing:
an acquisition module including instructions that when executed by the one or more processors cause the one or more processors to acquire data that specifies a steering angle for the vehicle; and
a guideline determination module including instructions that when executed by the one or more processors cause the one or more processors to determine, based on the steering angle data, a left three-dimensional guideline wall and a right three-dimensional guideline wall that together identify a potential path of travel for the vehicle, and determine a curvature of the left and right three-dimensional guideline walls based on a gradient of a road along the potential path of travel, wherein the left and right three-dimensional guideline walls each have a height based at least on a height of a portion of the vehicle and a slope based at least on a gradient of a road along the potential path of travel, and wherein the left and right three-dimensional guideline walls have a distance therebetween based at least on a width of the vehicle; and
a display device configured to display a field of view exterior to the vehicle and the left and right three-dimensional guideline walls, wherein the left and right three-dimensional guideline walls overlay the field of view, and wherein the curvature of the left and right three-dimensional guideline walls is continually updated on the display device in response to detected changes in the gradient.

16. The vehicle guidance system of claim 15, wherein the guideline determination module further includes instructions to determine a width of each of the left and right three-dimensional guideline walls.

17. The vehicle guidance system of claim 16, wherein each of the height, a position, and the width of the left and right three-dimensional guideline walls is adjustable by the user.

18. The vehicle guidance system of claim 15, wherein the left and right three-dimensional guideline walls are spaced from each other and wherein the guideline determination module further includes instructions to determine a surface extending between the left three-dimensional guideline wall and the right three-dimensional guideline wall, and wherein the display device is further configured to display the surface by overlaying the surface on the field of view.

19. A vehicle guidance system for aiding a user navigating a vehicle, comprising:
one or more processors;
a memory communicably coupled to the one or more processors and storing:
an acquisition module including instructions that when executed by the one or more processors cause the one or more processors to acquire data that specifies a steering angle for the vehicle; and
a guideline determination module including instructions that when executed by the one or more processors cause the one or more processors to determine, based on the steering angle data, a left three-dimensional guideline wall and a right three-dimensional guideline wall that together identify a potential path of travel for the vehicle, and determine a curvature of the left and right three-dimensional guideline walls based on a gradient of a road along the potential path of travel, wherein the left and right three-dimensional guideline walls each have a height based at least on a height of a portion of the vehicle and are adjustable by the user via one of an adjustable knob, a slide, or a touchscreen, and wherein the left and right three-dimensional guideline walls have a distance therebetween based at least on a width of the vehicle; and
a display device configured to display a field of view exterior to the vehicle and the left and right three-dimensional guideline walls, wherein the left and right three-dimensional guideline walls overlay the field of view, and wherein the curvature of the left and right three-dimensional guideline walls is continually updated on the display device in response to detected changes in the gradient.

* * * * *